United States Patent [19]
Duncan

[11] 4,269,072
[45] May 26, 1981

[54] FLEXURE ASSEMBLY FOR A DYNAMICALLY TUNED GYROSCOPE

[75] Inventor: Damon H. Duncan, Phoenix, Ariz.

[73] Assignee: Sperry Corporation, New York, N.Y.

[21] Appl. No.: 11,965

[22] Filed: Feb. 14, 1979

[51] Int. Cl.³ ............................................. G01C 19/22
[52] U.S. Cl. ..................................... 74/5 F; 29/434; 308/2 A
[58] Field of Search ............... 74/5 F; 64/15 B, 27 B; 308/2 A; 29/434, 558

[56] References Cited

U.S. PATENT DOCUMENTS

| | | | |
|---|---|---|---|
| 2,931,092 | 4/1960 | Humphrey | 308/2 A |
| 2,947,067 | 8/1960 | Vice et al. | 308/2 A X |
| 2,960,302 | 11/1960 | Brown | 74/5 F X |
| 3,301,073 | 1/1967 | Howe | 74/5.7 |
| 3,354,726 | 11/1967 | Krupick et al. | 74/5 F |
| 3,498,144 | 3/1970 | Gooss | 74/5 F |
| 3,515,006 | 6/1970 | Duck | 74/5 F |
| 3,529,477 | 9/1970 | Quermann | 74/5 |
| 3,543,301 | 11/1970 | Barnett | 74/5 F |
| 3,678,746 | 7/1972 | Erdley et al. | 74/5 |
| 3,700,290 | 10/1972 | Ensinger | 74/5 F X |
| 3,832,906 | 9/1974 | Craig | 74/5 F |
| 3,856,366 | 12/1974 | Weisbord et al. | 308/2 A |
| 3,943,778 | 3/1976 | Wyse | 74/5 F |
| 3,957,316 | 5/1976 | Armitage | 308/2 A |
| 4,062,600 | 12/1977 | Wyse | 308/2 A |
| 4,100,813 | 7/1978 | Previte | 74/5 F |

OTHER PUBLICATIONS

"The Dynamically Tuned Free Rotor Gyro", Howe et al., pp. 67–72, *Control Engineering*, 6/64.

*Primary Examiner*—Rodney H. Bonce
*Attorney, Agent, or Firm*—Howard P. Terry

[57] ABSTRACT

A flexure assembly for a dynamically-tuned, free rotor, two axis gyroscopic sensor wherein coplanar, concentric, cylindrical inner and outer gimbals are coupled between corresponding cylindrical axially spaced, inner and outer cylindrical members, to which are secured respectively the gyroscopic rotor and the rotor spin shaft, by means of flexures which provide substantially rigid axial and radial support of the rotor relative to the drive shaft and relative angular freedom of tilt of the rotor about orthogonal axes perpendicular to the drive shaft axis, wherein the flexures comprise separate thin strips fabricated from high-strength, spring-quality sheet metal which bridge gaps formed between the gimbal members and the rotor and rotor shaft members and are secured at their ends as by brazing, welding, cementing, etc. in receiving slits machined in these members. Also disclosed is a method of fabricating such a flexure assembly wherein the method includes machining the gimbals from cylindrical blanks in a way to leave webs connecting all the members together until the slits are machined and the flexible strips are secured in place and the outer and inner members assembled and secured together, and then removing the connecting webs whereby to assure protection from assembly damage and to assure ultimate precision alignment of the gimbals, flexure blades and members relative to each other. Also included is an improved gimbal balancing and tuning arrangement.

11 Claims, 8 Drawing Figures

FLEXURE ASSEMBLY FOR A DYNAMICALLY TUNED GYROSCOPE

BACKGROUND OF THE INVENTION

1. Field of the Invention

The present invention relates generally to free rotor gyroscopes and, more particularly, to double gimbal flexure suspensions for dynamically tuned, free rotor gyroscopes.

2. Description of the Prior Art

Free rotor gyroscopes such as Applicant's Assignee's U.S. Pat. No. 3,529,477, and dynamically tuned, free rotor gyroscopes of the type disclosed, for example, in an article entitled "The Dynamically Tuned Free Rotor Gyro" by E. W. Howe and P. H. Savet, appearing at pages 67-72 of the June 1964 issue of Control Engineering and in U.S. Pat. Nos. 3,678,764 and 3,943,778, are well known in the art. Further, double gimbal flexure suspensions for such gyros are disclosed in, for example, U.S. Pat. Nos. 3,832,906; 3,856,366; 3,943,778; 4,062,600 and 4,100,813.

Figure 1:
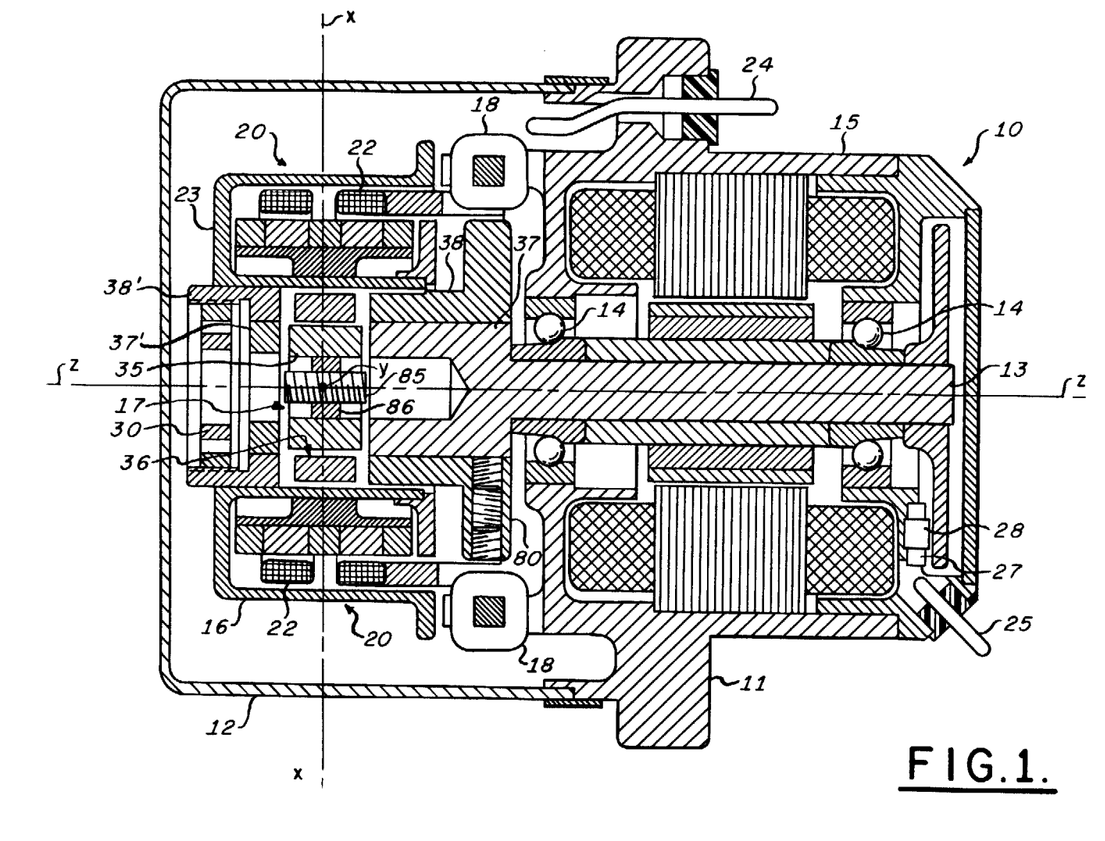
FIG. 1 is a longitudinal cross-sectional view of the dynamically tuned flexure gyroscope embodying the present invention.
Figure 1A:
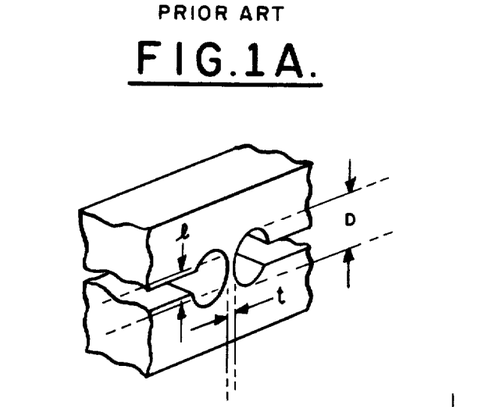
FIG. 1A is an illustration of a typical prior art flexure.

In the flexures known to the prior art, as exemplified in the latter group of the above patents, and as typically shown in FIG. 1A, each of the four flexure blades of each of the two gimbals is formed by machining two holes very closely together such as to leave a very thin, generally tangential wall section "t"—on the order of one-to-two thousandths of an inch between the holes. This design configuration has several design deficiencies as will be discussed in the following paragraphs.

The presence of material defects in the flexures is a potential problem with the prior art mentioned. These flexure assemblies are fabricated from one or two relatively large pieces of material having the required end-product physical characteristics. Although relatively clean alloys can be achieved by current vacuum melt techniques, some lack of homogeneity is always possible. A flaw or material defect in any one of the thin flexures can lead to the loss of the entire assembly during the manufacturing process and/or failure of the instrument in service.

The potential for flexure damage during the manufacturing and calibration process is high for the prior art designs. Referring to FIG. 1A, the holes "D" must be drilled, bored, reamed, and polished to extremely precise dimensions. Since the wall thickness "t" of the flexure is of the order of one-to-two thousandths of an inch, these operations must be conducted with great care to prevent permanent deformation or other damage to the flexures. If EDM (Electrical Discharge Machining, a well understood technique) is employed, the basic holes can be formed precisely with no stressing of the flexures, but additional difficulties arise; for example, a thin layer of material known as the recast layer is formed in which there are surface cracks and metalurgically altered material. If this recast layer (typically one thousandth of an inch thick) is not removed, the flexure will have a drastically reduced fatigue life. Therefore, the recast layer must be removed by polishing, etching or otherwise, further complicating the manufacture of the flexure assemblies and increasing their costs. This is also true for flexures fabricated by EDM techniques in configurations other than the twin hole technique.

The precision machining required for a good quality flexure assembly of the prior art is difficult, time-consuming, and costly. The flexure spring rates required for miniature, low-speed, dynamically-tuned gyroscopes, are typically 0.004 inch pound/radian per flexure, or less. Since miniaturization limits the basic hole diameter "D" to approximately 0.047 inches, the effective length "l" of the flexure is approximately 0.010 inches. Consequently, the flexure thickness "t" must be extremely thin, usually less than one-thousandth inch in order to achieve the required spring rate. Furthermore, the spring rate of each of the flexures of the complete gimbal flexure assembly, involving at least 8 flexures, should be very closely matched and the angular spacing of the flexure axes must be precise in order to minimize torque rectification due to vibration at 2×N frequencies. Typically, spring rate matching requires additional material removal from the flexure blades as a calibration step.

The complexity of the inertial tuning and center-of-gravity gimbal adjustments required on the prior art designs contributes to high costs. In the cited prior art, double gimbal flexures, the inertias and centers-of-gravity of each of the gimbals is adjusted to achieve cancellation of spring rates at the desired operating speed N and cancellation of rectification torques due to linear and/or angular vibrations at 2×N frequencies. For example, each of the gimbals will produce torque rectification due to 2×N vibration but the rectification torque vectors will be equal in magnitude but opposite in direction and thus cancel each other provided that the spring rates, flexure axes spacing, inertias, and centers-of-gravity of the gimbals are carefully matched for this characteristic. In the prior art, the inertia and center-of-gravity adjustments are accomplished by a plurality of adjustable balance weights on both of the gimbals, these weights comprising screws axially adjustable in a plurality of tapped holes around the periphery of the gimbal. This balance weight configuration requires the precision location, drilling and tapping of the gimbal holes (as many as eight) thereby increasing manufacturing costs and requiring complex and tedious adjustment of each screw.

Prior art flexure designs do not make provisions for balancing the gyro to minimize torque rectification due to synchronous vibration along the spin axes at 1×N frequencies. This error torque originates due to the radial location of the center-of-gravity of the gyro rotor not being coincident with the center of support provided by the flexure suspension system. If not calibrated, errors of this type can be as high as 100°/hr per g of vibration amplitude. Proper calibration is achieved by vibrating the assembly at 1×N frequencies and balancing the rotor to minimize this effect. Since this will lead to an over-all rotational dynamic imbalance of the gyro, provisions must be made to correct this imbalance by a "shaft-fixed" balancing system.

Furthermore, in the prior art flexures, the gimbal associated with the spin shaft are machined from blanks separate from the shaft and thereafter secured to the shaft. This technique leads to misalignment of the flexure axes relative to the spin axis of the gyro, which degrades the over-all performance of the gyro—especially in the presence of dynamic inputs.

SUMMARY OF THE INVENTION

The present invention provides a double gimbal flexure suspension for a dynamically tuned two axis gyro sensor which overcomes the aforementioned and other problems associated with the prior art flexure suspensions. According to this invention, each of the flexure elements comprise separate blades fabricated from thin, high-strength, spring quality sheet metal, such as is marketed under the well known trademark Elgiloy, thereby assuring material homogeneity, precision control of flexure thickness, and a predictable and uniform spring constant for all of the flexures of the completed assembly. These separate blades are then inserted into correspondingly thin slits in the gimbal members such that they bridge gaps of equal length formed between the gimbal members and the rotor and rotor shaft cylindrical support members, and thereafter secured in place as by cementing, welding, brazing or the like. In the present two gimbal flexure suspension, one of the gimbals is termed the outer gimbal while the other is termed the inner gimbal. Each of these gimbals is fabricated from a cylindrical blank, the inner gimbal cylindrical blank being formed on the end of the spin shaft as an integral extension of it, thereby assuring alignment of gimbal and shaft axes. The inner diameter of the outer gimbal blank and the outer diameter of the inner gimbal blank are nearly the same so that the latter fits within the former with minimum clearance. Each gimbal, located longitudinally centrally of each cylindrical blank and ultimately coplanar with each other is fabricated out of the blank by EDM machining slots in a predetermined pattern such as to ultimately separate each gimbal from its cylindrical blank and to leave gaps across which the flexure strips will span. However, certain positions of the slots are not fully machined away so as to leave webs interconnecting the gimbal portion with the ends of each blank and forming an integral and rigid structure. This rigid structure is then wire EDM machined at the gap areas to form flexure blade receiving slits with the assurance that the slits are perfectly aligned on each side of the gaps. The flexure blades are inserted into the slits and secured. The inner and outer cylindrical members are then carefully assembled, aligned and bonded together. Thereafter, the interconnecting webs are EDM machined away leaving the cylindrical end members flexibly interconnected with the gimbals and flexure blades aligned with great precision. This slit pattern on the outer gimbal is such that the flat dimension of the flexure blades lie in a horizontal plane perpendicular to the spin axis thereby providing substantially rigid support of the rotor against radial movement while the slit pattern of the inner gimbal is such that the flat dimension of the blades lie in planes parallel with the spin shaft axis thereby providing substantially rigid support of the rotor against axial movement. One end of the outer cylindrical member and the spin shaft end of the inner cylindrical member are bonded together as stated so that both are driven by the spin shaft while the other ends of the cylindrical members are also bonded together as stated and the gyro rotor in turn bonded thereto; the double gimbal and flexures providing a dynamically tunable interconnection between the spin shaft and gyro rotor as taught in the cited references. The spin shaft end of the outer cylindrical member includes a radially extending flange with radially adjustable balance screws therein for dynamically balancing the over-all gyro after the rotor has been balanced to minimize sensitivity of the gyro to vibrations along the spin axis at 1×N frequency while a single balance screw is axially adjustably mounted in the inner bore of the inner gimbal for adjusting the center of gravity of the gimbal assembly and permit gimbal inertia adjustments to minimize the twice rotor frequency rectification discussed in the references.

Thus, a primary object of the present invention is to provide an improved flexure/gimbal assembly for dynamically tuned free rotor flexure gyroscopes. Other objects and features of the present invention will become apparent as a preferred embodiment of the invention is described in detail hereinbelow, reference being made to the accompanying drawings.

DESCRIPTION OF THE PREFERRED EMBODIMENT

Referring now to FIG. 1, there is shown a longitudinal cross-section of a free rotor, two axis, dynamically tuned gyroscopic rotation sensor constructed in accordance with the teachings of the present invention. The over-all configuration is similar to the flexure gyroscope shown in the above U.S. Pat. No. 3,529,477 so that a detailed description of the basic structure is not necessary. Briefly, the sensor comprises a housing or casing 10 adapted to be secured to a vehicle the motion of which is to be sensed. This may be accomplished through a gimbal arrangement or through a strap-down arrangement, both arrangements being well known to those skilled in the gyroscope art. The case 10 comprises a generally cylindrical, flanged base 11 and cover 12. To illustrate the degree of miniaturization afforded by the present invention the case dimensions of one embodiment thereof are: diameter (less mounting flange)—1.25 inches; length—1.68 inches. The base 11 provides a support structure for the gyro rotor spin shaft 13, spin shaft bearings 14 and spin motor 15. The gyro rotor 16 is flexibly mounted on an extension of the drive shaft 13 through a double gimbal, dynamically tuned flexure assembly 17, to be described in detail below. Thus, the rotor 16 is spun by shaft 13 about the sensor spin axis z—z through the flexure gimbal assembly 17, while the latter provides limited rotational or tilt freedom about orthogonal axes x—x, y—y, respectively orthogonal to spin axis z—z. A balance weight 30 may be provided for locating the c.g. of the rotor at the intersection of the x, y, and z axis.

Tilt of the gyro rotor 16 about sensing axes x and y in response to corresponding rotation of the case 10 or vehicle, is detected by suitable inductive pick-offs 18 and 19 for each axis, the pick-off for detecting such rotation about the y axis being illustrated at 18; pick-off 19 not being visible in the FIG. 1 cross-section. As is well known in gyro sensors of the present type, tilt of the rotor in response to case rotation about the sensing axes x and y is opposed by applying a precession torque about the orthogonal axes y and x to maintain the rotor spin axis aligned with the case spin axis, the magnitude of the torquing current being proportional to the rate of case rotation. In the embodiment of FIG. 1, the opposing torque is provided by inductive torque motors 20 and 21 effective about the x and y axes, torquer 20 is effective about axis y and comprises coils 22 fixed to case 10 and annular magnetic armature structure 23 mounted on the rotor 16. The coils for torquer 21 are not visible in the FIG. 1 cross-section. For a detailed disclosure of the structure and operation of the pick-offs 18, 19 and torquers 20 and 21, reference may be made to Applicant's Assignee's copending U.S. patent application Ser. No. 818,486, filed July 25, 1977 in the names of C. Buckley and J. Kiedrowski and entitled "Permanent Magnet Torquer for Free Rotor, Flexure Suspended Gyroscopes". Electrical connections to the electrical components within the case 10 are conventionally made by suitable sealed terminals 24 distributed about the flanged base 11; terminals 25 serve to provide an electrical connection to a conventional rotor tachometer 26 comprising coil 27 and armature 28 for controlling rotor speed, as will be further discussed below.

The theory and operating principles of a dynamically tuned, free rotor gyroscopic sensor is well understood and described in a large body of literature, including the Control Engineering article and patents referenced above, and a detailed discussion thereof herein would be superfluous. Suffice it to say here that the key to the success of such a gyro lies in the design of the gimbal/-flexure interface between the gyro spin shaft and the gyro rotor and the manufacturability at reasonable cost, including calibration costs, the reliability and of course its "goodness", as characterized primarily by minimum gyro drift rate, of this design. The gimbal/flexure interface 17 of the gyro of FIG. 1 and its method of fabrication and calibration provide improvements in all of these areas and will now be described in detail, reference being made to FIGS. 2A and 3A as well as FIG. 1.

In general, the gimbal/flexure assembly 17 comprises a pair of concentric, coplanar, cylindrical inner and outer gimbals 35, 36 coupled between corresponding cylindrical axially spaced inner and outer cylindrical members 37, 37' and 38, 38', the members 37, 38 and 37' and 38' being themselves secured together as integral members and are in turn respectively secured to the rotor drive shaft 13 and the rotor 16. The inner gimbal 35 is coupled between inner cylindrical members 37, 37' by means of flexures 40, see FIG. 2A, and outer gimbal 36 is coupled betweem outer cylindrical members 38, 38' by means of flexures 41, see FIG. 3A. The flexures 40 and 41, when assembled in the manner to be described below, are so oriented and arranged that they together substantially rigidly support the rotor 16 relative to the drive shaft against axial and radial translational forces but permit relative angular freedom of tilt of the rotor about tilt axes x and y.

As is well known in this particular gyro art, it is desired that the gyro rotor has a zero spring rate about the tilt axes, that is, upon tilt of the rotor 16 about axes x and/or y, there will be zero restoring force from the flexure support mechanism. As taught in the various cited references, this is accomplished in this type of gyro, at a given speed, by selecting and controlling the moments of inertia of the gimbals about the x, y and z axes which through the flexures, impose a dynamic, negative or overturning spring effect on the rotor which desirably exactly cancels the positive or return spring effect of the flexures at a predetermined rotor spin frequency. While it is possible to accomplish the dynamic tuning of the gyro using a single gimbal, in practice secondary effects arise, primarily torque rectification due to linear and/or angular vibration at twice spin frequency. These effects can be compensated to a great extent by use of the second gimbal as taught, for example in the cited '764, '778, '366 and '600 patents.

Figure 2:
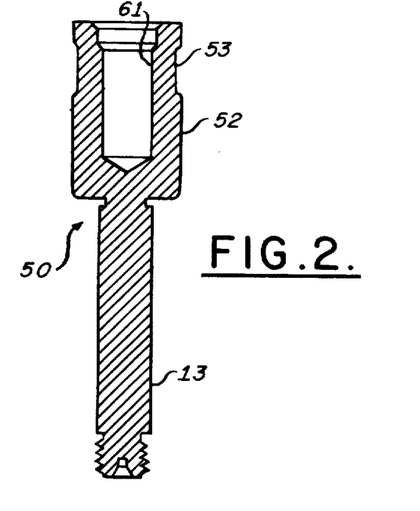
FIGS. 2 and 2A are a sectional view of the inner gimbal blank and a perspective view thereof after initial machining and prior to assembly.
Figure 3:
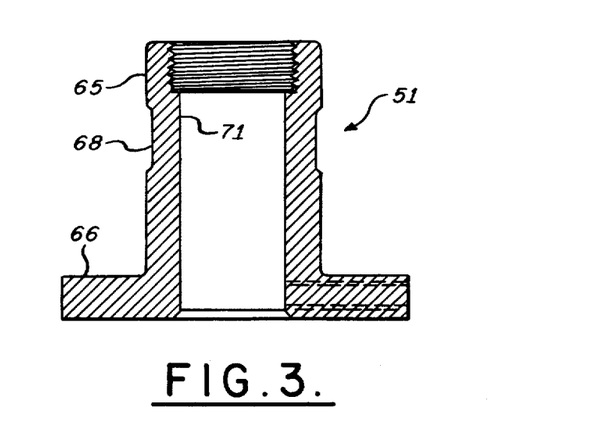
FIGS. 3 and 3A are sectional and perspective views similar to FIGS. 2 and 2A of the outer gimbal blank.

In accordance with the teachings of the present invention, the inner and outer gimbals 35 and 36 are machined from cylindrical blanks 50 and 51 having cross-section configurations illustrated in FIGS. 2 and 3, respectively. Note that the inner gimbal blank 50 includes the rotor drive or spin shaft 13 thereby assuring ultimate precision alignment of this shaft 13 with the inner gimbal 35. Precision machining of these blanks is performed by conventional turning and grinding operations. Slots s, s', h and h' are formed by conventional EDM techniques; slits 60 and 70 are formed by the "travelling wire" EDM technique. However, it will be noted that the EDM process is not used to form the flexure blades thereby avoiding the recast layer fatigue problem mentioned above. All EDM surfaces resulting from the present invention are non-critical surfaces insofar as the flexures are concerned and hence do not affect the reliability of the flexures themselves.

Figure 2A:
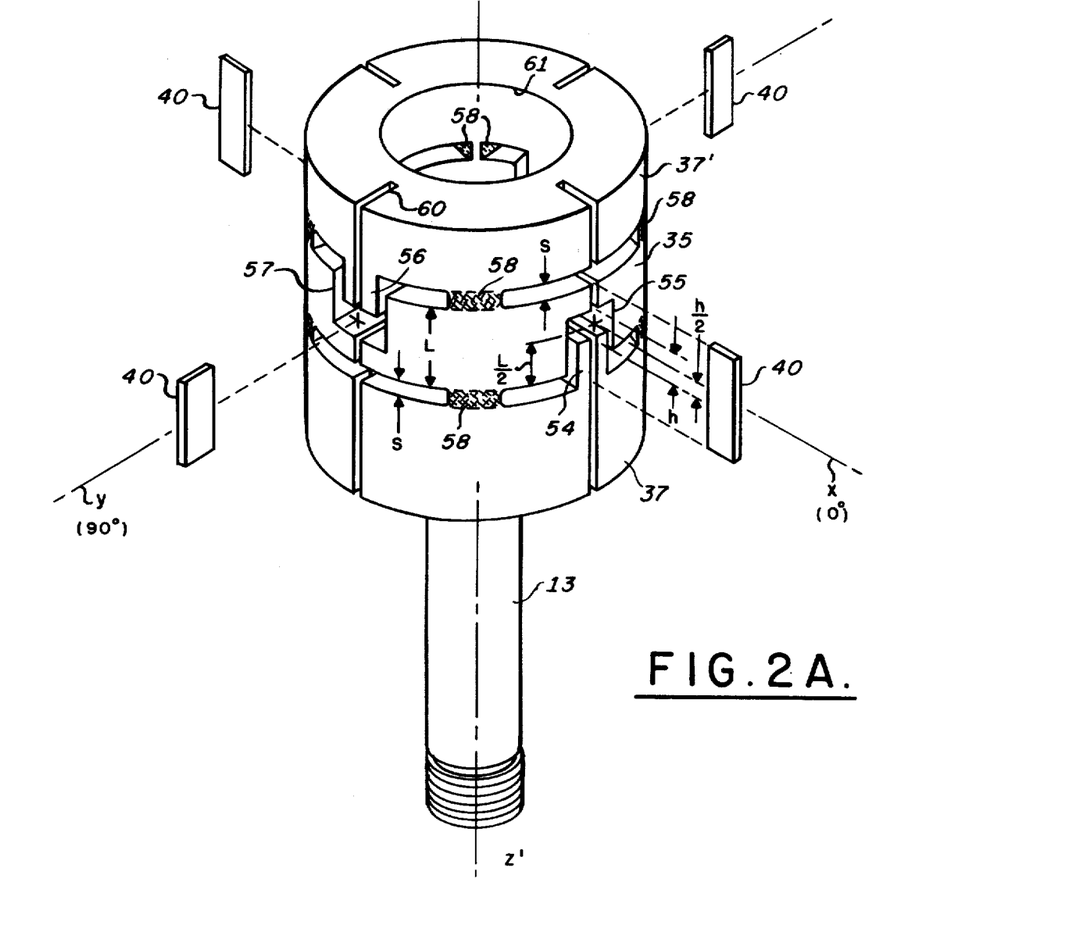

Referring now to FIGS. 2 and 2A, the inner gimbal blank 50 comprises a cylindrical member 52 formed as an extension of the spin shaft 13 and conventionally machined from a bar of suitable metal. The peripheral area 53 at which the gimbal will be machined is relieved in diameter somewhat to provide gimbal clearance when assembled as will be described. The machining pattern is illustrated generally in FIG. 2A and in more detail in FIG. 4A, the latter representing a planar layout of the outer peripheral surface of the cylindrical surface of inner gimbal blank 50. It will be noted that the machining pattern is such as to form upper and lower (as viewed in the figures) gimbal isolating slots s which ultimately isolate the gimbal 35 from the inner portion 37 and outer portion 37' of blank 50. Also, the pattern forms vertical gaps h between axially extending posts 54 on the inner portion 37 of blank 50 and corresponding axially extending notches 55 in gimbal 35 at the general 0° and 180° location. Similar posts 56 and notches 57 are provided between the outer portion 37' of blank 50 and gimbal 35 at the general 90° and 270° location. The axial or vertical dimensions of each of the gaps h is such that its center lies precisely at the middle of the axial length L of the gimbal 35 and on the axes x and y. Thus, if the machining of slots s and notches 57 were perfect and the mass of the gimbal uniform, the c.g. of the gimbal 35 will lie precisely at the intersection of the x, y and z axes (see FIG. 1). Obviously, such perfection is practically impossible and compensation means must be provided, as will be described. In accordance with the present invention, the isolation slots s are not fully machined but instead the slot machining is interrupted so as to leave interconnecting webs between the inner and outer members 37 and 37' and the gimbals 35, as illustrated by the cross hatched areas 58 of FIGS. 2A and 4A. These webs are triangular in shape due to the travelling wire EDM electrode machining process. Therefore, the inner gimbal 35 and end portions 37 and 37' are, at this point, one integral element.

In accordance with the teachings of the present invention, the blank 50 as so far machined, is further machined, again using the "travelling wire" EDM process, in a manner to form narrow, axially extending slits 60 precisely in the planes defined by the xz and yz axes and extending radially to a depth short of the internal bore 61 of the blank 50. Since all elements are integrally connected by the webs 58, precision alignment of the slits across the gaps h is assured. In accordance with the invention, the flexure blades 40 are inserted into the slits 60 so that their outer edges are flush with the outer surface of gimbal 35 and bridge the gaps h. Their ends are secured in the slits as by welding, brazing or cementing. Each flexure is thus precisely aligned to lie in the xz and yz planes at the gaps h between the members 37, 37' and the gimbal 35, and will ultimately provide angular motion between these elements precisely about the x and y axes and also substantially rigid support of the element 37' against axial translation. Each flexure blade 40 is made to be essentially identical by chemically milling from thin, high strength, spring quality sheet metal such as well known Elgiloy metal which has been 85% cold worked with the "roll grain" parallel to the long dimension of the blade. Conventional heat treating is desirable to provide the required strength. This completes the initial machining and assembly of the inner gimbal assembly.

The outer gimbal 36 is formed from the outer gimbal blank 51 in a similar manner. Referring to FIG. 3, the outer gimbal blank comprises a cylinder 65 having at its inner or lower end, as viewed in FIGS. 4 and 4A, a radially extending flange 66 having three tapped, equiangularly spaced radially extending holes 67 therein for receiving calibration balance masses, as will be described. As with the inner cylinder blank 51, the peripheral surface which will become the outer surface of the outer gimbal, is relieved in diameter as at 68, to provide required clearance upon assembly. The internal bore of the cylinder end opposite to the flanged end is provided with threads within which the rotor balance mass 30 may be adjustably mounted.

Figure 3A:
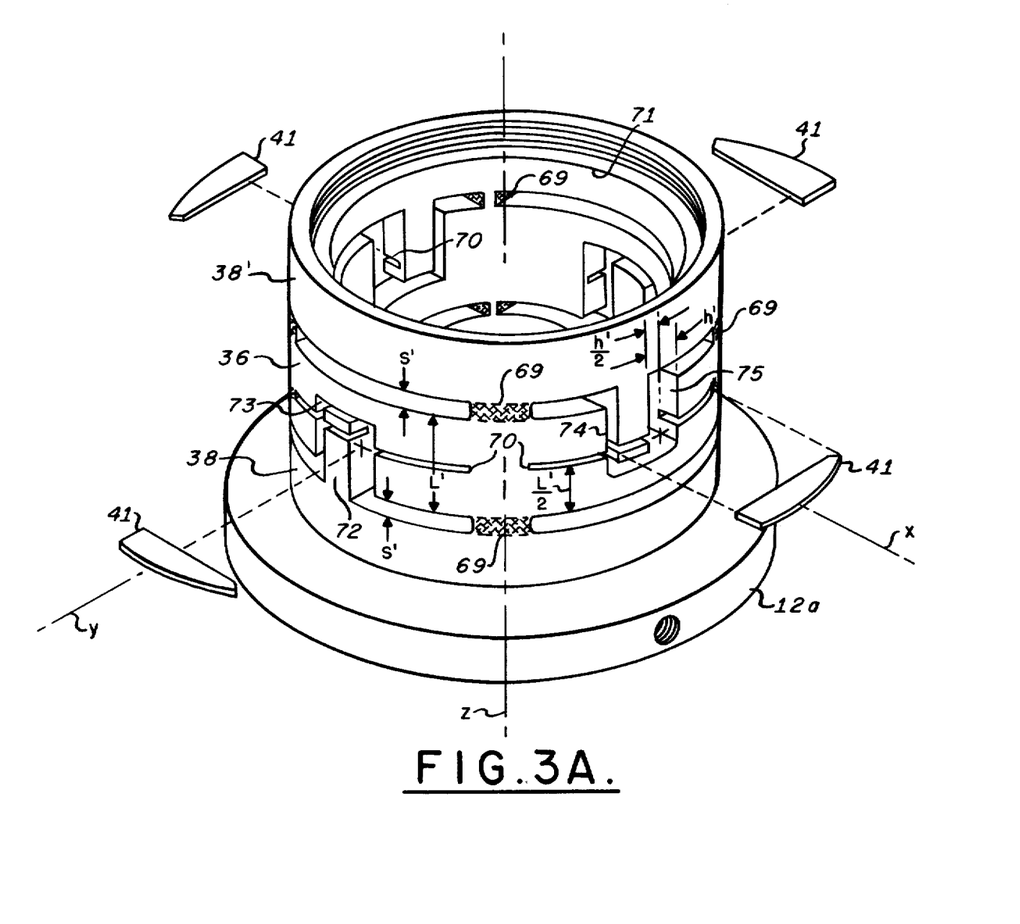
Figure 4A:
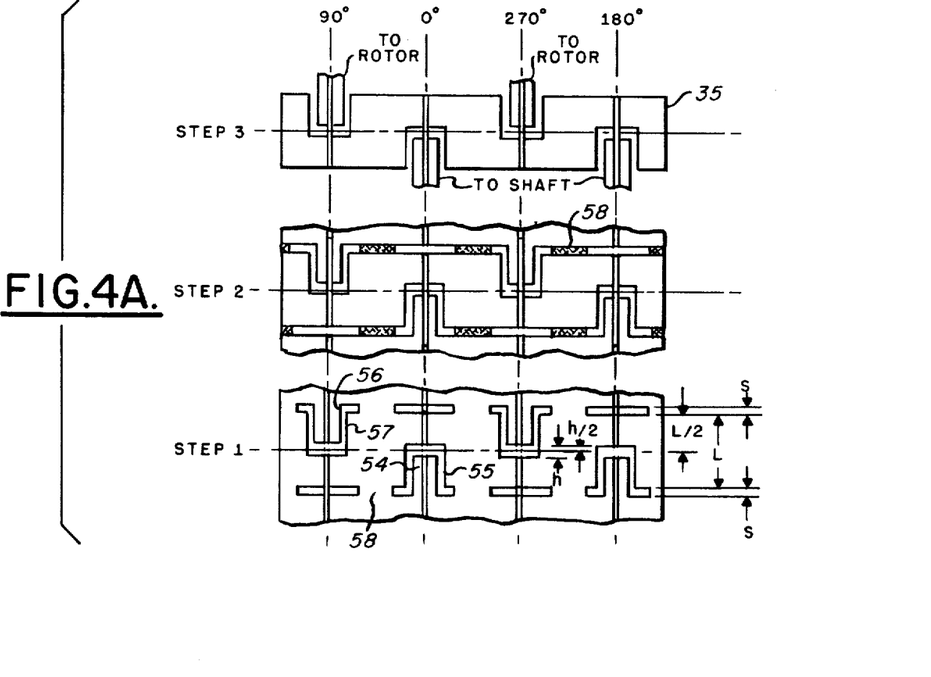
FIGS. 4A and 4B are diagrammatic views of the cylindrical inner and outer gimbals respectively laid out as planar surfaces and illustrating the slot/slit patterns at various assembly stages.
Figure 4B:
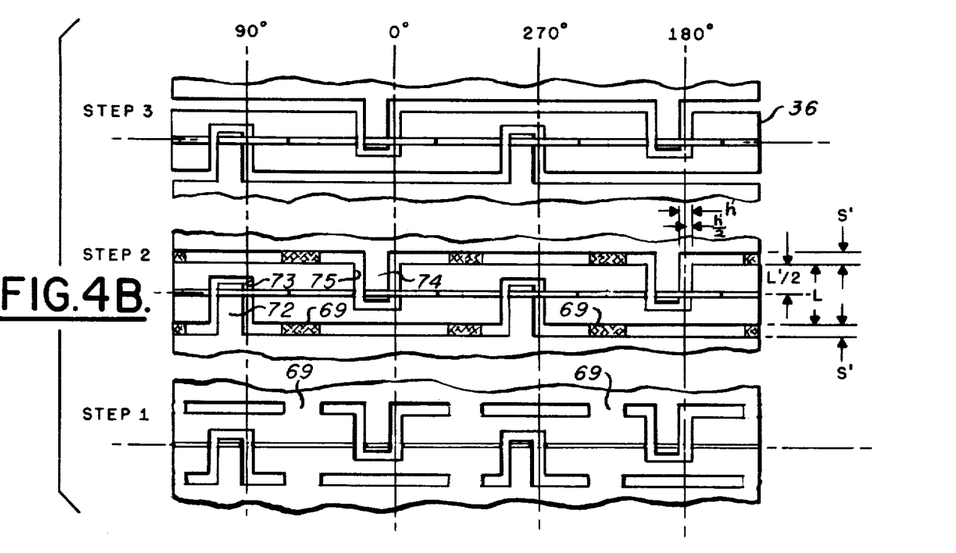

As with the inner blank 50, the machining pattern for the blank 51 is illustrated generally in FIG. 3A and more specifically in FIG. 4B. It will be noted that the machining pattern is also similar to that for the inner gimbal blank, the primary difference being the orientation of the gaps h' which are horizontal, as viewed in the figures, instead of vertical. However, the gaps h' are identical in width with the gaps h. The machining pattern illustrated in FIG. 4B forms the horizontal gaps h' between axially extending posts 72 on the inner portion 38 of blank 51 and corresponding horizontally extending notches 73 in gimbal 36 at the general 90° and 270° locations. Similar posts 74 and notches 75 are provided between the outer portion 38' of blank 51 and gimbal 36 at the general 0° and 180° location. As before, the dimensions of each of the gaps h' is such that its center lies precisely at the middle of the axial length L' of the gimbal 36 and on the axes x and y. The gimbal notch dimensions and angular locations are identical whereby the c.g. of the gimbal 36 will lie precisely at the intersection of the x, y and z axes (see FIG. 1). Another difference is that the isolation slots s' are slightly wider than the gaps h to facilitate the EDM process later used to remove the inner gimbal webs 58. Note also that the temporary interconnecting webs 69 are angularly located to correspond with the location of the webs 58 to facilitate their ultimate removal. The blank 51 as so far machined is further machined in a manner to form narrow horizontally extending slits 70 precisely in the plane defined by the x and y axes and extending radially to a depth short of the internal bore 71 of the blank 51. Again, since all elements are integrally connected by webs 69, precision alignment of the slits across the gaps h' is assured. The flexure blades 41 are inserted into the slits 70 so that their outer edges are flush with the outer surface of the gimbal 36 and so that they bridge the gaps h' with their ends then secured in the slits as before. Note that the ends of blades 41 are contoured so that they are substantially flush with the curved surface of the gimbal 36. However, over the span of the gaps h' the blades have identically the same width as the blades 40. Each flexure 41 is thus precisely aligned to lie in the x-y plane at the gaps h' between the members 38, 38' and the gimbal 36 and will therefore ultimately provide angular motion precisely about axes x and y and also substantially rigid support of the element 38' against radial translations. This completes the initial machining and assembly of the outer gimbal assembly.

With their webs 58 and 70 still interconnecting the gimbals 35 and 36 with their respective members 37, 37' and 38,38' to assure maintenance of precision alignment of the elements, the inner gimbal assembly of FIG. 2A is inserted axially into the bore 71 of the outer gimbal assembly of FIG. 3A until the centerlines of the gaps h and h'; that is, the centerlines illustrated in FIGS. 4A and 4B are precisely coplanar and the angular locations 0°, 90°, 180° and 270° are precisely coaligned. As shown most clearly in FIG. 1, the inner cylindrical members 37 and 38 and 37' and 38' are secured or bonded together, such as by cementing, or by other suitable securing means. It will be noted that the inner cylindrical members 37, 38 comprise an integral structure and the outer cylindrical members 37', 38' comprise an integral structure. It will also be noted that the two gimbals are angularly displaced 90° with respect to one another so that the assembly will not rectify linear and/or angular vibrations at twice the wheel speed frequency.

After this assembly step is complete, the assembly is subjected to a further EDM machining by which the interconnecting webs 48 and 69 are removed, thereby freeing the inner and outer gimbals 35 and 36 so that they are now interconnected with the integral inner members 37, 38 and integral outer members 37', 38' only by the flexure blades 40 and 41 with the blades as precisely aligned as machining and aligning tolerances will permit. Thus, the inner and outer structures 37, 38, 37' and 38' are interconnected by a double gimbal, flexure gimbal assembly 35, 36 which provides rigid support of the outer integral structure (to which the rotor 16 will be mounted) against radial and axial translations relative to spin axis z while providing angular tilt freedom about tilt axis x and y. Furthermore, the uniform thickness of the flexure blades over the full length of the gaps h and h' permit the achievement of a very low spring rate without resorting to excessively thin flexures. This design thus permits much more flexibility in the selection of the over-all dimensions of the sensor and tuned rotor spin frequency. It will also be noted that all of the flexure axes lie in a common plane and flex about an axis at the mid length of the blades, which construction minimizes the angular spring-rate of the assembly and allows the gimbal c.g.'s to lie in the plane of the flexure axes.

Referring again to FIG. 1 it will be seen that the rotor 16 is bonded, again as by cementing, to the outer integral cylindrical member 37', 38', the rotor cup-shaped configuration being such that the rotor center of gravity lies on the intersection of the x, y and z axes. Slight adjustments of the rotor c.g. location may be made by the balance weight 30 to achieve the desired location. The remainder of the gyro unit construction has been described above and need not be repeated here.

The over-all operation of a double gimbal, dynamically tuned gyroscopic sensor is fully described in the references and is familiar to those skilled in this art and a detailed description is therefore unnecesary. However, there are features of the improved design of the gyro of the present invention which will now be pointed out. In general, these design features relate to the tuning and calibration of the unit.

First, the radial balance weights 80 in the flange 66 of the integral inner member 37, 38 provide a means by which the over-all gyro assembly may be dynamically balanced after the rotor has been balanced such that its center of gravity coincides with the center of support of the gimbal/flexure assemblies. This technique minimizes the sensitivity of the gyro to synchronous vibration at the gyro's spin frequency along the gyro spin axis. Such vibrations may be induced for example, by imperfections in the spin shaft and bearing geometrics or external vibrations induced from sources external of the gyro.

The second design feature facilitating the calibration of the gyro may be made evident by observing the two conventional tuning equations for a dynamically tuned flex gyro. The first of these equations is as follows:

$$N^2 = \frac{(K_{xi} + K_{yi}) + (K_{xo} + K_{yo})}{(A_i + B_i - C_i) + (A_o + B_o - C_o)}$$

where

N is the tuned rotor spin frequency $K_{xi}$ and $K_{yi}$ are the spring rates of the flexures of the inner gimbal about the x and y axes, respectively.

$K_{xo}$ and $K_{yo}$ are the spring rates of the flexures of the outer gimbal about the x and y axes, respectively.

$A_i, B_i$ and $C_i$ are the moments of inertia of the inner gimbal about the x, y and z axes, respectively, and $A_o, B_o$ and $C_o$ are the moments of inertia of the outer gimbal about the x, y and z axes.

This equation represents the rotor speed or spin frequency necessary to achieve a zero spring rate for the gyro. This equation may be satisfied by adjusting the rotor spin speed of the hysteresis synchronous motor by means of the gyro power supply. With the design of the present invention, the inertias and spring rates are sufficiently accurate and uniform such that a speed range of approximately ±10% from the nominal speed will assure proper tuning.

The second equation represents the conditions required to eliminate any torque rectification due to vibration at 2 N frequencies.

$$O = \frac{(K_{xi} - K_{yi})e^o + (K_{xo} - K_{yo})e^{j\pi}}{(K_{xi} + K_{yi}) + (K_{xo} + K_{yo})} +$$

$$\frac{(A_i + B_i - C_i)e^o + (A_o + B_o - C_o)e^{j\pi}}{(A_i + B_i - C_i) + (A_o + B_o - C_o)}$$

where K's and A, B and C's are as above and where the $e^o$ and $e^{j\pi}$ (with symmetrical flexure axes spacing) terms represent opposing unit vectors.

It will be noted that due to the improved design and method of manufacture of the present invention, the spring rates of all the flexures will be substantially perfectly matched; symmetrical spacing is achieved via the EDM machining technique previously described. It will be noted from this equation then, that it is only necessary that the absolute value of $A_i + B_i - C_i$ equals the absolute value of $A_o + B_o - C_o$. Therefore, the moment of inertia of only one gimbal about x, y and z axes need be tuned. For this purpose a tuning screw 85 is mounted by means of a threaded sleeve 86 bonded centrally within the internal bore of the inner gimbal 35. This screw only need therefore be selected in length to achieve the calibration of the gyro to eliminate the 2 N rectification referred to above. The axial position of this screw is located to adjust the C.G. of the inner gimbal such that the torque rectification due to the minute offset of the C.G. of the outer gimbal is approximately cancelled by the torque rectification due to the C.G. offset of the inner gimbal. In practice, both of these screw adjustments (length and position) will be made simultaneously by utilizing measured 2 N vibration data in conjunction with a conventional computer routine. This feature results in the achievement of high accuracy at reduced price part costs and calibration costs.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A flexure assembly for a dynamically tuned flexure suspended free rotor gyroscopic sensor comprising first and second axially spaced hollow, equal diameter cylindrical members, the first of said members being driven by a gyro spin shaft about a spin axis and the second of said members supporting a gyro rotor normally coaxially with said spin axis, a first hollow cylindrical gimbal member between said coaxial with said first and second members having a diameter substantially equal to said first and second cylindrical members and adapted to support said rotor on said spin shaft for tilting about first and second mutually orthogonal tilt axes normal to said spin axis, said gimbal and the first of said cylindrical members including a first pair of diametrically opposite gap-defining means and said gimbal and the second of said cylindrical members including a second pair of diametrically opposite gap-defining means, said gap-defining means being so constructed that all of said gaps are of substantially equal length and the centers of one pair of gaps lie along said first tilt axis and the centers of the other pair of gaps lie along said second tilt axis, each of said gap-defining means on said gimbal and first and second cylindrical members including elongated narrow slits collinearly extending from said gaps and into said gap defining means to an extent such as to provide separated, elongated flexure plate support surfaces, said slits being normal to said respective first and second axes, and a thin, high strength, elongated flexure blade having its ends secured between each of said elongated narrow slits and its mid portion bridging each of said gaps, each of said blades having as nearly identical spring characteristics as possible whereby to provide substantially identical flexure characteristics between said gimbal and first and second members in response to angular tilt of said rotor about said first and second axes.

2. The flexure assembly as set forth in claim 1 wherein each of said gap-defining means comprises an axially extending notch in said gimbal and an axially extending post on said cylindrical member, the dimensions of said notch and post defining said gap and said narrow slit extending collinearly in said post and a wall of said notch.

3. The flexure assembly as set forth in claim 2 wherein the dimensions of each of said notches and posts define gaps, the axial centers of which lie on said tilt axes and the center of gravity of said gimbal lies substantially at the intersection of said tilt axes with said spin axis.

4. The flexure assembly as set forth in claim 1 further including third and fourth axially spaced, hollow, equal diameter cylindrical members, said diameter being such that said first and second members and said third and fourth members fit within and are secured to one another whereby both said first and third members are driven by said gyro spin shaft and said second and fourth members support said gyro rotor, a second hollow cylindrical gimbal member between and coaxial with said third and fourth members having a diameter substantially equal to said third and fourth members but sufficiently different from the diameter of said first gimbal that said first and second gimbals fit within one another with limited clearance and are substantially axially coextensive with one another, said second gimbal adapted to support said rotor for tilting about said first and second axes, said second gimbal and the third of said cylindrical members including a first pair of diametrically opposite gap-defining means and said second gimbal and the fourth of said cylindrical members including a second pair of diametrically opposite gap-defining means, said latter gap-defining means being so constructed that their gap lengths are equal and the centers of one pair of gaps lie along said first tilt axis and the centers of said second pair of gaps lie along said second tilt axis, each of said gap-defining means on said second gimbal and third and fourth cylindrical members including elongated narrow slits collinearly extending from said gaps and into said gap-defining means to an extent such as to provide spaced, elongated flexure blade support surfaces, said slits being normal to said respective first and second axes, and a thin, high strength, elongated flexure blade having its ends secured between each of said elongated narrow support surfaces and its mid portion bridging each of said gaps, each of said blades having as nearly identical spring characteristics as possible whereby to provide as nearly identical flexure characteristics as possible between said second gimbal and third and fourth members to angular tilt of said rotor about said axes.

5. The flexure assembly as set forth in claim 4 further including a radially extending flange on one of said first or third cylindrical members, a plurality of radially extending tapped holes in said flange, and a balance screw means adjustably mounted within each of said tapped holes for adjusting the center of gravity of said rotor to be coincident with the center of support of said gimbal and flexures whereby to eliminate synchronous vibration errors.

6. The flexure assembly as set forth in claim 4 further including an internally threaded sleeve secured to the internal surface of the innermost of said gimbal members substantially at the center of the axial length of said gimbal, and a balance screw means adjustably mounted within said sleeve for adjusting the center of gravity of one of said gimbal members relative to the other whereby to cancel any torque rectification contributed by any mass unbalance of either or both of said gimbal members.

7. The flexure assembly as set forth in claim 4 wherein all of said gaps are of substantially equal length and all of the flexures have as nearly identical spring characteristics as possible.

8. The flexure assembly as set forth in claim 4 wherein each of said gap-defining means between said second gimbal and said third and fourth members comprises an axially extending notch in said second gimbal and an axially extending post on said third and fourth members, the dimensions of said notch and post defining said gap, and said narrow slit extending collinearly in said post and a wall of said notch, the narrow slits in said first gimbal and first and second members and flexure blades therein extending parallel with said spin axis whereby to substantially rigidly support said rotor against axial transiational forces and the narrow slits in said second gimbal and said third and fourth members and the flexure blades therein extending parallel with in the plane of said first and second tilt axes whereby to support said rotor against radial translational forces.

9. The method of fabricating a flexure assembly as defined in claim 1 comprising the steps of partially forming in an elongated hollow cylindrical blank a pair of parallel axially spaced isolation slots through the walls of said blank for separating said blank into said first and second axially spaced cylindrical members and said gimbal member but leaving a plurality of web portions interconnecting said gimbal and members whereby to retain a substantially rigid integral structure, forming said gap-defining means in said gimbal and first and second members, forming said narrow slits in said gap-defining means, assembling and securing said flexure blades in said slits, and finally removing said interconnecting webs whereby to leave said gimbal flexibly interconnected between said first and second cylindrical members by said flexure blades.

10. The method as set forth in claim 9 for fabricating the flexure assembly as defined in claim 4 comprising the further steps of partially forming in a second elongated, cylindrical blank, a pair of parallel, axially spaced isolation slots through the walls of said blank for separating said blank into said third and fourth axially spaced cylindrical members and said second gimbal member but leaving a plurality of web portions interconnecting said gimbal and members whereby to retain a substantially rigid integral structure, forming said gap-defining means in said second gimbal and third and fourth members, forming said narrow slits in said last-mentioned gap-defining means, securing said flexure blades in said last-mentioned slits, assembling said integral first gimbal and first and second members with said flexure blades secured in place with said integral second gimbal and third and fourth members with said flexure blades secured in place so that said first and second gimbals and said first and third, second and fourth members fit within one another, aligning said assembled members so that said first and second tilt axes of each of the integral structures are coaligned, securing said first and third and second and fourth cylindrical members together, and finally removing all of said interconnecting webs whereby to leave said first and second gimbals flexibly interconnected with said secured first and third and second and fourth cylindrical members by said flexure blades.

11. The method as set forth in claim 10 wherein spin shafts is formed on said first elongated hollow cylindrical blank as an integral, coaxial extension thereof, and wherein said resulting first gimbal and first and second members with said flexure blades in place are assembled within said second gimbal and third and fourth members with said flexure blades in place.

* * * * *